(12) United States Patent
Panigrahi et al.

(10) Patent No.: US 10,321,172 B2
(45) Date of Patent: Jun. 11, 2019

(54) SYSTEM AND METHOD FOR HOSTING A PERSONALIZED TELEVISION CHANNEL

(71) Applicant: SLING MEDIA PVT LTD, Bangalore (IN)

(72) Inventors: Biswaranjan Panigrahi, Bangalore (IN); Gireesh Kumar M, Bangalore (IN); Vineet Govil, Bangalore (IN)

(73) Assignee: SLING MEDIA LLC, Foster City, CA (US)

( * ) Notice: Subject to any disclaimer, the term of this patent is extended or adjusted under 35 U.S.C. 154(b) by 0 days.

(21) Appl. No.: 13/796,612

(22) Filed: Mar. 12, 2013

(65) Prior Publication Data
US 2014/0189763 A1    Jul. 3, 2014

(30) Foreign Application Priority Data
Dec. 31, 2012 (IN) .......................... 5545/CHE/2012

(51) Int. Cl.
| | |
|---|---|
| *H04N 7/173* | (2011.01) |
| *H04N 21/258* | (2011.01) |
| *H04N 21/63* | (2011.01) |
| *H04N 21/64* | (2011.01) |
| *H04N 21/45* | (2011.01) |
| *H04N 21/4788* | (2011.01) |
| *H04N 21/462* | (2011.01) |
| *H04N 21/2668* | (2011.01) |
| *H04N 21/2743* | (2011.01) |

(52) U.S. Cl.
CPC ... *H04N 21/25808* (2013.01); *H04N 7/17318* (2013.01); *H04N 21/2668* (2013.01); *H04N 21/2743* (2013.01); *H04N 21/45* (2013.01); *H04N 21/4622* (2013.01); *H04N 21/4788* (2013.01); *H04N 21/63* (2013.01); *H04N 21/64* (2013.01)

(58) Field of Classification Search
CPC .... H04N 21/63; H04N 21/64; H04N 21/4788; H04N 21/4622; H04N 21/45; H04N 7/17318
USPC ... 725/37–61, 80, 86–89, 92, 133, 134, 141, 725/142
See application file for complete search history.

(56) References Cited

U.S. PATENT DOCUMENTS

| | | | |
|---|---|---|---|
| 2002/0059621 A1* | 5/2002 | Thomas et al. .................. | 725/87 |
| 2005/0028208 A1* | 2/2005 | Ellis et al. ...................... | 725/58 |
| 2006/0095471 A1* | 5/2006 | Krikorian et al. .......... | 707/104.1 |
| 2008/0022298 A1* | 1/2008 | Cavicchia ....................... | 725/25 |

(Continued)

*Primary Examiner* — Nasser M Goodarzi
*Assistant Examiner* — Patrick A Ryan
(74) *Attorney, Agent, or Firm* — Lorenz & Kopf LLP (57) ABSTRACT

According to various exemplary embodiments, systems and methods are described, wherein the system implements a method executable by a host placeshifting device communicating via a network with a client and a backend media server, the method comprising: providing digital media content in the host placeshifting device; determining the presence of the client for receiving the digital media content; providing the client with electronic access to the digital media content via the network and the backend media service; and distributing the digital media content from the host placeshifting device over the network and via the backend server to the client, wherein the digital media is distributed in the form of a personalized television channel produced by the host placeshifting device.

13 Claims, 3 Drawing Sheets

(56) References Cited

U.S. PATENT DOCUMENTS

| | | | |
|---|---|---|---|
| 2010/0146527 A1* | 6/2010 | Craib et al. | 725/5 |
| 2010/0153989 A1* | 6/2010 | Jing | H04L 12/2812 |
| | | | 725/34 |
| 2012/0047532 A1* | 2/2012 | McCarthy, III | H04N 5/44543 |
| | | | 725/39 |
| 2013/0034306 A1* | 2/2013 | Ivanov | H04N 21/42202 |
| | | | 382/224 |

* cited by examiner

SYSTEM AND METHOD FOR HOSTING A PERSONALIZED TELEVISION CHANNEL

CROSS-REFERENCES TO RELATED APPLICATIONS

This Application claims priority to India Provisional Patent Application No. 5545/CHE/2012, filed Dec. 31, 2012.

TECHNICAL FIELD

The present disclosure generally relates to systems and methods for providing personalized media content, for example via a server and/or other device over a network. More particularly, the present disclosure relates to systems and methods for hosting a personalized television channel.

BACKGROUND

The Internet and other digital communications networks continue to have significant effects on every aspect of personal and professional life. Network communications are becoming increasingly ubiquitous due to the reduced cost and increased capability of portable computing devices, as well as the increasing prevalence and capability of mobile telephony and other wireless communications technologies. Additionally, more and more devices, including set top boxes (STBs), television receivers, personal or digital video recorders (DVRs), placeshifting devices and the like are becoming enabled for communications over digital networks. Consumers are therefore expecting convenient control of their media content from a wide range of locations and settings.

Recently, consumers have expressed significant interest in "place shifting" devices that allow viewing of television or other media content at locations other than their primary television set. Place shifting devices typically packetize media content that can be transmitted over a local or wide area network to a portable computer, mobile phone, personal digital assistant, remote television or other remote device capable of playing back the packetized media stream for the viewer. Placeshifting therefore allows consumers to view their media content from remote locations such as other rooms, hotels, offices, and/or any other locations where portable media player devices can gain access to a wireless or other communications network.

As a result, it is now desirable to create systems and methods for expanding the capabilities of a placeshifting device to allow the user thereof to host a personalized television channel that is viewable to other users upon the permission of the host user. Such systems and methods would ideally provide a rich set of media information delivery and media control options that would be available from a wide array of client devices. These and other desirable features and characteristics will become apparent from the subsequent detailed description and the appended claims, taken in conjunction with the accompanying drawings and this background section.

BRIEF SUMMARY

According to various exemplary embodiments, the present disclosure generally relates to systems and methods for providing personalized media content, for example via a server and/or other device over a network. More particularly, the present disclosure relates to systems and methods for hosting a personalized television channel.

According to various exemplary embodiments, systems and methods are described, wherein the system implements a method executable by a host placeshifting device communicating via a network with a client and a backend media server, the method comprising: providing digital media content in the host placeshifting device; determining the presence of the client for receiving the digital media content; providing the client with electronic access to the digital media content via the network and the backend media service; and distributing the digital media content from the host placeshifting device over the network and via the backend server to the client, wherein the digital media is distributed in the form of a personalized television channel produced by the host placeshifting device.

In another exemplary embodiment, a system that communicates via a network with a client and a backend media server comprises: a host placeshifting device that is configured to allow the following steps to be performed thereon by a host user: providing digital media content in the host placeshifting device; determining the presence of the client for receiving the digital media content; providing the client with electronic access to the digital media content via the network and the backend media service; and distributing the digital media content from the host placeshifting device over the network and via the backend server to the client, wherein the digital media is distributed in the form of a personalized television channel produced by the host placeshifting device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter. Various other embodiments, aspects and features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is merely exemplary in nature and is not intended to limit the invention or the application and uses of the invention. Furthermore, there is no intention to be bound by any theory presented in the preceding background or the following detailed description.

Figure 1:
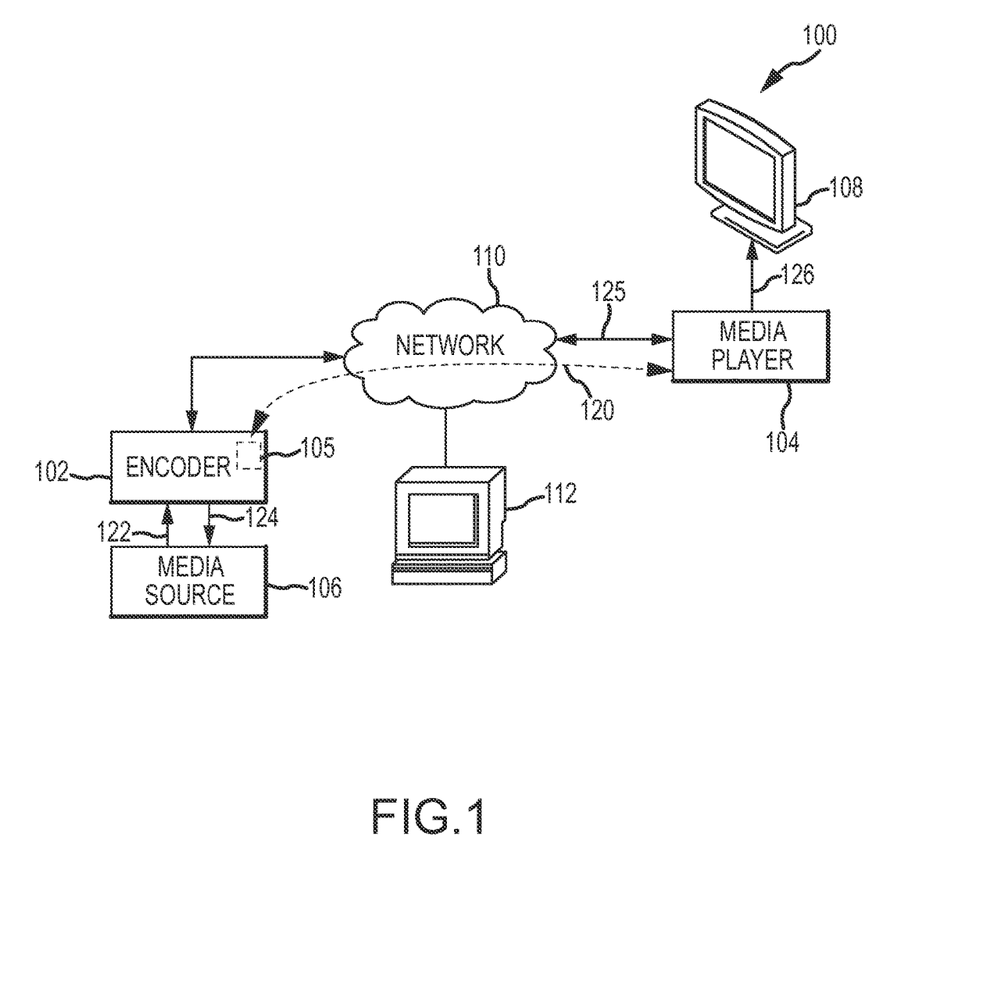
FIG. 1 is a block diagram of an exemplary media encoding system.

Turning now to the drawing figures and with initial reference to FIG. 1, an exemplary placeshifting system 100 suitably includes a placeshifting encoder system 102 that receives media content 122 from a content source 106, encodes the received content into a streaming format, and then transmits the encoded media stream 120 to a media player 104 over network 110. The media player 104 suitably receives the encoded stream 120, decodes the stream, and presents the decoded content to a viewer on a television or other display 108. In various embodiments, a server 112 may also be provided to communicate with encoder system 102 and/or player 104 via network 110 to assist these devices in locating each other, maintaining security, providing or receiving content or information, and/or any other features as desired. This feature is not required in all embodiments, however, and the concepts described herein may be deployed in any data streaming application or environment, including placeshifting but also any other media or other data streaming situation.

Placeshifting encoder system 102 is any component, hardware, software logic and/or the like capable of transmitting a packetized stream of media content over network 110. In various embodiments, placeshifting device 102 incorporates suitable encoder and/or transcoder (collectively "encoder") logic to convert audio/video or other media data 122 into a packetized format that can be transmitted over network 110. The media data 122 may be received in any format, and may be received from any internal or external source 106 such as any sort of broadcast, cable or satellite television programming source, a "video-on-demand" or similar source, a digital video disk (DVD) or other removable media, a video camera, and/or the like. Encoder system 102 encodes media data 122 to create media stream 120 in any manner. In various embodiments, encoder system 102 contains a transmit buffer 105 that temporarily stores encoded data prior to transmission on network 110. As buffer 105 fills or empties, one or more parameters of the encoding (e.g., the bit rate of media stream 120) may be adjusted to maintain desirable picture quality and data throughput in view of the then-current network performance. As described more fully below, various embodiments are able to calculate a current encoding rate and a current network transfer rate, and are able to adjust the encoding rate as the network transfer rate changes. Changes in the network transfer rate may be identified from, for example, changes in the utilization of the outgoing buffer 105.

Several examples of encoding systems 102 may be implemented using any of the various SLINGBOX products available from Sling Media of Foster City, Calif., although other products could be used in other embodiments. Many different types of encoder systems 102 are generally capable of receiving media content 122 from an external source 106 such as any sort of digital video recorder (DVR), set top box (STB), cable or satellite programming source, DVD player, and/or the like. In such embodiments, encoder system 102 may additionally provide commands 124 to the source 106 to produce desired signals 122. Such commands 124 may be provided over any sort of wired or wireless interface, such as an infrared or other wireless transmitter that emulates remote control commands receivable by the source 106. Other embodiments, however, particularly those that do not involve placeshifting, may modify or omit this feature entirely.

In other embodiments, encoder system 102 may be integrated with any sort of content receiving or other capabilities typically affiliated with source 106. Encoder system 102 may be a hybrid STB or other receiver, for example, that also provides transcoding and placeshifting features. Such a device may receive satellite, cable, broadcast and/or other signals that encode television programming or other content received from an antenna, modem, server and/or other source. The receiver may further demodulate or otherwise decode the received signals to extract programming that can be locally viewed and/or place shifted to a remote player 104 as appropriate. Such devices 102 may also include a content database stored on a hard disk drive, memory, or other storage medium to support a personal or digital video recorder (DVR) feature or other content library as appropriate. Hence, in some embodiments, source 106 and encoder system 102 may be physically and/or logically contained within a common component, housing or chassis.

In still other embodiments, encoder system 102 is a software program, applet or the like executing on a conventional computing system (e.g., a personal computer). In such embodiments, encoder system 102 may encode, for example, some or all of a screen display typically provided to a user of the computing system for placeshifting to a remote location. One device capable of providing such functionality is the SlingProjector product available from Sling Media of Foster City, Calif., which executes on a conventional personal computer, although other products could be used as well.

Media player 104 is any device, component, module, hardware, software and/or the like capable of receiving a media stream 120 from one or more encoder systems 102. In various embodiments, remote player 104 is personal computer (e.g., a "laptop" or similarly portable computer, although desktop-type computers could also be used), a mobile phone, a personal digital assistant, a personal media player (such as the ARCHOS products available from the Archos company of Igny, France) or the like. In many embodiments, remote player 104 is a general purpose computing device that includes a media player application in software or firmware that is capable of securely connecting to placeshifting encoder system 102, as described more fully below, and of receiving and presenting media content to the user of the device as appropriate. In other embodiments, however, media player 104 is a standalone or other separate hardware device capable of receiving the media stream 120 via any portion of network 110 and decoding the media stream 120 to provide an output signal 126 that is presented on a television or other display 108. One example of a standalone media receiver 104 is the SLINGCATCHER product available from Sling Media of Foster City, Calif., although other products could be equivalently used.

Network 110 is any digital or other communications network capable of transmitting messages between senders (e.g., encoder system 102) and receivers (e.g., receiver 104). In various embodiments, network 110 includes any number of public or private data connections, links or networks supporting any number of communications protocols. Network 110 may include the Internet, for example, or any other network based upon TCP/IP or other conventional protocols. In various embodiments, network 110 also incorporates a wireless and/or wired telephone network, such as a cellular communications network for communicating with mobile phones, personal digital assistants, and/or the like. Network 110 may also incorporate any sort of wireless or wired local area networks, such as one or more IEEE 802.3 and/or IEEE 802.11 networks.

Encoder system 102 and/or player 104 are therefore able to communicate with player 104 in any manner (e.g., using any sort of data connections 128 and/or 125, respectively). Such communication may take place over a wide area link that includes the Internet and/or a telephone network, for example; in other embodiments, communications between devices 102 and 104 may take place over one or more wired or wireless local area links that are conceptually incorporated within network 110. In various equivalent embodiments, encoder system 102 and receiver 104 may be directly connected via any sort of cable (e.g., an Ethernet cable or the like) with little or no other network functionality provided.

Many different placeshifting scenarios could be formulated based upon available computing and communications resources, consumer demand and/or any other factors. In various embodiments, consumers may wish to placeshift content within a home, office or other structure, such as from a placeshifting encoder system 102 to a desktop or portable computer located in another room. In such embodiments, the content stream will typically be provided over a wired or wireless local area network operating within the structure. In other embodiments, consumers may wish to placeshift content over a broadband or similar network connection from a primary location to a computer or other remote player 104 located in a second home, office, hotel or other remote location. In still other embodiments, consumers may wish to placeshift content to a mobile phone, personal digital assistant, media player, video game player, automotive or other vehicle media player, and/or other device via a mobile link (e.g., a GSM/EDGE or CDMA/EVDO connection, any sort of 3G or subsequent telephone link, an IEEE 802.11 "Wi-fi" link, and/or the like). Several examples of placeshifting applications available for various platforms are provided by Sling Media of Foster City, Calif., although the concepts described herein could be used in conjunction with products and services available from any source.

Encoder system 102, then, generally creates a media stream 120 that is routable on network 110 based upon content 122 received from media source 106. To that end, and with reference now to FIG. 2, encoder system 102 typically includes an encoder module 202, a buffer 105 and a network interface 206 in conjunction with appropriate control logic 205. In operation, encoder module 202 typically receives media content 122 from an internal or external source 106, encodes the data into the desired format for media stream 120, and stores the encoded data in buffer 105. Network interface 206 then retrieves the formatted data from buffer 105 for transmission on network 110. Control module 205 suitably monitors and controls the encoding and network transmit processes carried out by encoding module 202 and network interface 206, respectively, and may perform other features as well. Encoder system 102 may also have a module 208 or other feature capable of generating and providing commands 124 to an external media source 106, as described above.

Figure 2:
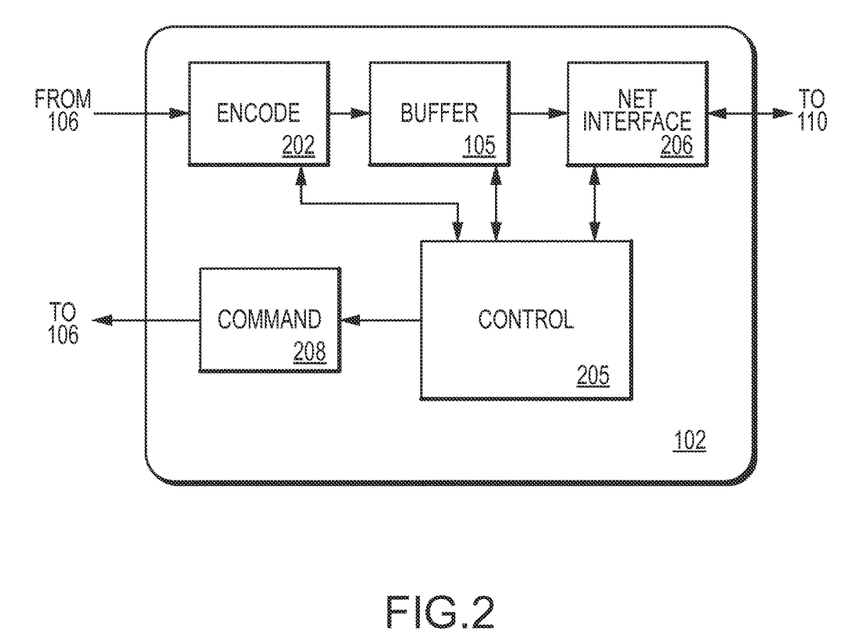
FIG. 2 is a block diagram of an exemplary media encoding device.

In the exemplary embodiment shown in FIG. 2, modules 202, 105, 205, 206 and 208 may be implemented in software or firmware residing in any memory, mass storage or other storage medium within encoder system 102 in source code, object code and/or any other format. Such features may be executed on any sort of processor or microcontroller executing within encoder system 102. In various embodiments, encoder system 102 is implemented as a system on a chip (SoC) type system with integrated processing, storage and input/output features. Various SoC hardware implementations are available from Texas Instruments, Conexant Systems, Broadcom Inc., and other suppliers as appropriate. Other embodiments may use any number of discrete and/or integrated processing components, memories, input/output features and/or other features as desired.

As noted above, creating a media stream 120 typically involves encoding and/or transcoding an input media stream 122 received from an internal or external media source 106 into a suitable digital format that can be transmitted on network 110. Generally, the media stream 120 is placed into a standard or other known format (e.g., the WINDOWS MEDIA format available from the Microsoft Corporation of Redmond, Wash. although other formats such as the QUICKTIME format, REALPLAYER format, MPEG format, and/or the like could be used in any other embodiments) that can be transmitted on network 110. This encoding may take place, for example, in any sort of encoding module 202 as appropriate. Encoding module 202 may be any sort of hardware (e.g., a digital signal processor or other integrated circuit used for media encoding), software (e.g., software or firmware programming used for media encoding that executes on the SoC or other processor described above), or the like. Encoding module 202 is therefore any feature that receives media data 122 from the internal or external source 106 (e.g., via any sort of hardware and/or software interface) and encodes or transcodes the received data into the desired format for transmission on network 110. Although FIG. 2 shows a single encoding module 202, in practice system 102 may include any number of encoding modules 202. Different encoding modules 202 may be selected based upon preference of player 104, network conditions, and/or the like.

In various embodiments, encoder 202 may also apply other modifications, transforms and/or fillers to the received content before or during the transcoding process. Video signals, for example, may be resized, cropped and/or skewed. Similarly, the color, hue and/or saturation of the signal may be altered, and/or noise reduction or other filtering may be applied. Audio signals may be modified by adjusting volume, sampling rate, mono/stereo parameters, noise reduction, multi-channel sound parameters and/or the like. Digital rights management encoding and/or decoding may also be applied in some embodiments, and/or other features may be applied as desired.

In various embodiments, including those in which media is streamed to media player 104 that comprises a general purpose computer running a media application, media player 104 produces and stores a time shift buffer that includes a buffer of the streamed media received over network 110, and includes a buffer seek module (comprising any combination of hardware and software) that allows a user to search within the buffer to find a particular scene or time and then continue viewing the media from that point.

Figure 3:
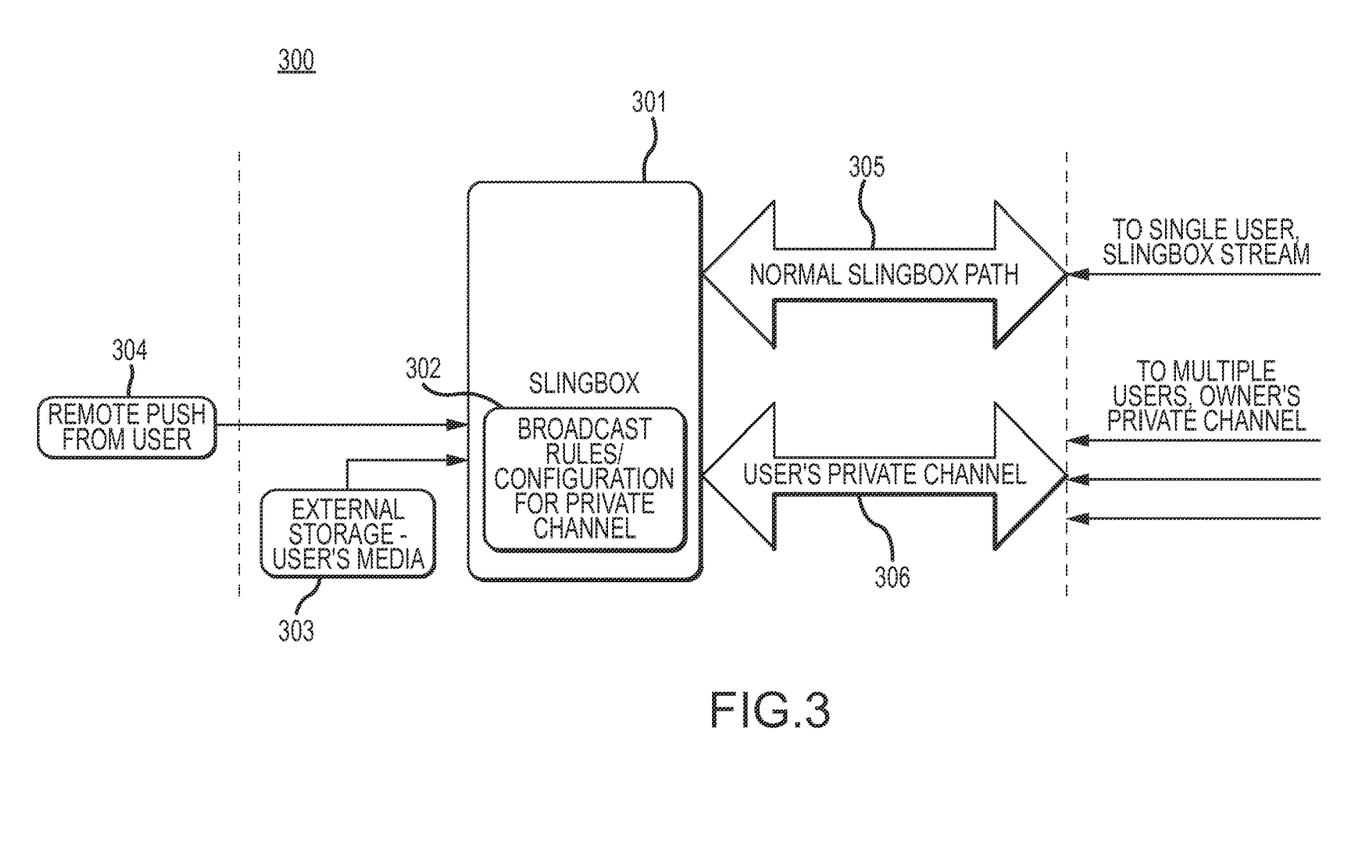
FIG. 3 is a block diagram of an exemplary system and method for hosting a personalized television channel in accordance with an embodiment of the present disclosure.

An exemplary system and method for allowing a user to host a personalized television channel may be implemented on a placeshifting device such as the one heretofore described with regard to FIGS. 1 and 2. With reference now to FIG. 3, a block diagram is provided that illustrates a system and method for allowing a user to host a personalized television channel using a placeshifting device. However, the system and method outlined in FIG. 3 is not limited to placeshifting devices; it can alternatively be implemented on any device that provides media content to a user and is connected to a network, including for example a set-top-box, a personal computer, a tablet device, a smartphone, etc.

In an embodiment, the placeshifting device allows multiple users at different geographical locations to watch the media content, for which the owner of the placeshifting device has copyrights, simultaneously. The owner of the placeshifting device can host a personal channel and broadcast the contents of the owner's choice to a set of users allowed by the owner to watch the channel. The owner/administrator can create and control a database of contents for which the owner has copyrights and host them on the owner's personal cloud (for example, extended storage on the placeshifting device) and take advantage of place-shifting and adaptive streaming technologies to provide a reliable mechanism to share it. The owner/administrator can also push contents in real time from a remote location from his camera enabled device to the channel by making a connection (over internet) with the placeshifting device. The owner/ administrator can allow the copyrighted content to be streamed to multiple people at various locations simultaneously. The owner also has full control of the storage and management of the owner's content and the user base.

Referring particularly to FIG. 3, in an embodiment, a system/method 300 is provided for hosting a personalized television channel. The system/method is implemented on a placeshifting device, such as a SLINGBOX 301. The device 301 includes a rules engine 302 that allows the user to define rights and privileges for others' access to the host's device 301. The rules engine, as shown in FIG. 3, may include broadcast rules and configuration rules for the private channel. In an example, a broadcast rule includes the type of content, or the particular (host-selected) content, allowed to be broadcast on the personalized channel. In another example, a broadcast rule includes the other types of user or the particular (host-selected) users who are allowed to view the personalized channel media content. Access to the rules engine may be guarded, for example, by a username/password access key.

With continued reference to FIG. 3, an external storage system 303 is connected to the device 301. External storage system may be a re-writable storage media such as a hard drive or flash drive, a permanent storage media such as CD or DVD, cloud storage system accessible over a network, or any other remote digital storage device. The external storage system 303 stores, among other things, digital media content as may be selected by or as may be created by the host user. For example, the host user may own copyrighted media content that is stored on the system 303. In another example, the user may generate (using a camera, microphone, etc.) media content that is subsequently stored on the system 303. The external storage system 303 is operable connected to the device 301, such that the device has access to the media content stored on system 303. The connection may be direct, indirect, or remote.

System/method 300 further includes a remote "push" interface 304 for receiving content from the host user. In an example, the remote interface is a media production device, for producing personalized media. For example, the media production device can include a camera/microphone combination. Using interface 304, the user can generate media content for supplying to the device 301. Alternatively, the personalized media generated thereby can be saved on the external storage device 303 for later distribution. The connection thereto may be made via device 301, for example.

The placeshifting device 301 includes a normal media receiving pathway 305 over which media is streamed to the placeshifting device. As described in greater detail above with regard to FIGS. 1 and 2, the receiving pathway 305 can include a network, for example the internet. As user herein, the term "pathway" refers to any dedicated digital communication media over which dedicated media content can be received into the device 301. As such, the system/method 300 allows for the placeshifting device to operate in the normal manner known in the art by receiving media content via pathway 305.

In addition to pathway 305, the device 301 is provided with a channel hosting interface operably connected to a channel hosting pathway 306 for allowing one or a plurality of additional users to view content from the placeshifting device as is hosted by the owner of the device 301 on a personalized television channel. As used herein, the term "television channel" is not only intended in its traditional sense of a broadcast channel received from a source that provides media content that is tunable by a media receiver; rather, herein the term television channel further describes any media content that is controlled by a host user and allowed to be viewable via pathway 306 to one or more remote users. The pathway 306 is provided in additional to pathway 305, and as such is intended to complement, not supplement the traditional functions of the placeshifting device (for example media viewing received via pathway 305).

In an embodiment, the placeshifting device 301 will reserve a dedicated port for hosting the channel. The dedicate port is also referred to as a dedicated interface for electronically interfacing with pathway 306. Users who are "subscribed" to this channel will connect to the placeshifting device 301 with the help of a backend infrastructure, such as the backend infrastructure that is currently employed in the art to support the provision of media content to the placeshifting device 301 via pathway 305. Once a connection is established, the users will get access to the content that is currently streaming, as direct by and controlled by the host user. Again, rules engine 302 is provide to allow the host user to define the media content "broadcast" on the channel, as well as the remote users who are allowed to "subscribe" thereto. Generally speaking, there may be no restrictions for the no. of users who are allowed to connect and receive the channel, so long as the host user provides such access. The owner/administrator can define and implement any usage rules if required/desired. The channel may further receive input from a local storage such as hard disk (303) or through a remote push from an internet capable device (304). The owner/administrator can define broadcasting rules and based on that the content will be served over the channel via the rules engine (302).

Greater detail is now provided regarding an exemplary rules engine 302. The content provision rules may be accessible to a content-providing user (also referred to as the "owner" of the content and operator of the placeshifting device 301, although the providing user may not own the content, but must have a right to control the content (i.e., a copyright)) via the content provision interface communicating with the content provision rules engine. The content provision rules engine may allow for the selection by a content provision user of what usages and approvals for usage will be allowable for the content made available by the content provision user. The digital content provided by the content provision user may be entered directly for storage in the external storage 303 through the content provision interface by the content provision user, or may be provided via a link to the content, which link is external to the content provision rules engine and interface, but which link may allow the content rules engine to draw the content from any source in any format. As such, the content provision rules engine may include a normalization engine whereby content may be discerned in any format, or any human or computer language, from any source and normalized to the preferred format employed by the content provision rules engine.

The usages allowable for the content provided by the content provision user, as per the rules selected or entered, may include usage with regard to particular media content as desired by the host user to be provided on the host user's personalized television channel. The allowable permissions may provide automatic approval for usages entered as being within pre-approved categories, or may provide that certain or all usage requests be forwarded back to the content provision user via the approval engine and approval engine interface for approval.

Greater information regarding remote system 303 is now provided. In an example, 303 is any device remote from the device 301 that is capable of storing digital data. For example, a data storage device as used herein is any device for recording (storing) information (data). Recording can be done using virtually any form of energy, from acoustic vibrations in phonographic recording, to electromagnetic energy modulating magnetic tape and optical discs. A storage device may hold information, process information, or both. A device may hold information that is on a recording medium. Devices that process information (data storage equipment) may either access a separate portable (removable) recording medium or a permanent component to store and retrieve information.

Greater information regarding "push" device 304 is now provided. For example, such a device may be of the type generally known in the art as digital recorders or digital cameras. Generally, a digital camera (or digicam) as used herein is a camera that takes video or still photographs by recording images on an electronic image sensor. Most cameras sold today are digital and digital cameras are incorporated into many devices ranging from PDAs and mobile phones (called camera phones) to vehicles. Digital and film cameras share an optical system, typically using a lens with a variable diaphragm to focus light onto an image pickup device. The diaphragm and shutter admit the correct amount of light to the imager, just as with film but the image pickup device is electronic rather than chemical. However, unlike film cameras, digital cameras can display images on a screen immediately after being recorded, and store and delete images from memory. Many digital cameras can also record moving video with sound. Some digital cameras can crop and stitch pictures and perform other elementary image editing.

Greater information regarding pathway 306 is now provided (communication pathway 305 is described in greater detail above regarding FIGS. 1 and 2). Pathway 306, for providing the personalized television channel to the users or "subscribers" as the host may allow (using the rules engine), may be implemented on any telecommunications network, with the personalized television content being provided to the network from the device 301 via the television hosting interface as described above. Generally, a telecommunications network as used herein is a collection of terminals, links and nodes which connect to enable telecommunication between users of the terminals. Each terminal in the network have a unique address so messages or connections can be routed to the correct recipients. The collection of addresses in the network is called the address space. The links connect the nodes together and are themselves built upon an underlying transmission network which physically pushes the message across the link, using circuit switched, message switched or packet switched routing.

In an embodiment, for pathway 306, a system employed in the manner of (some or all of) the systems described in "SYSTEMS AND METHODS FOR SECURELY STREAMING MEDIA CONTENT," US Patent Application Publication 2011/0231660, filed Mar. 22, 2011, is provided. The contents of such US Publication are explicitly incorporated herein by reference in their entirety, as if set forth fully herein.

The remote users can be informed by the host user of the availability of the personalized television channel by, fore example, the owner/administrator providing access to the channel by sharing a guest account or inviting them through social networking sites, etc. The guest account can be hosted by the backend systems of the placeshifting device 301, as noted above. The guest account can include a suitable username/password key, which can be provided to such remote user by the host user. Likewise, the host can provide an electronic key via social networking sites, for example via an electronic posting or message generated through such as site. The electronic key may even include a direct web-link to a web-enabled portal that allows the remote user to view the personalized television channel thereby.

In general, therefore, the systems and methods described herein can be employed to allow a host user to host their own, personalized "television channel" (as that term is used herein) registering with a placeshifting service provider (such as SLING MEDIA, as noted above) or configuring placeshifting device settings in the manner noted above. The user is thus able to share live contents anytime, anywhere among user base/family, social networking user, websites and other remote user clients as personalized "channels" of content created by or selected by the host user. The host user could share live contents with others using a placeshifting device such as a SLINGBOX, as described above. The host user may have the device enabled with a media "push" device such as camera to perform this activity. The device connects to the placeshifting device backend (which is already established for providing media content to the placeshifting device as is known in the art), such as a website, from which host the personalized channel. This personalized channel appears to a selected user base using a rules engine and can be shared among social networking site or can be shown on a websites, as allowed by the user, again using the rules engine for example.

While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of elements described without departing from the scope of the claims and their legal equivalents. The term "exemplary" is used herein to represent one example, instance or illustration that may have any number of alternates. Any implementation described herein as "exemplary" is not necessarily to be construed as preferred or advantageous over other implementations.

What is claimed is:

1. A method executable by a host placeshifting device communicating via a network with a first client device and a second client device, and a backend media server, the method comprising:
receiving a first digital media content signal at the host placeshifting device over a satellite, cable, or broadcast network, wherein the host placeshifting device is physically integrated with a digital media receiver that receives and demodulates the first digital media content signal and provides the demodulated first digital media content signal to the host placeshifting device, and wherein the host placeshifting device receives the demodulated first digital media content signal at a first media receiving pathway of the host placeshifting device;
while receiving the first digital media content signal, also receiving a second digital media content signal at the host placeshifting device, wherein receiving the second digital media content signal comprises receiving live streaming media content from a digital camera connected directly to the host placeshifting device via the internet and produced by an owner of the host placeshifting device, the second digital media content signal being pushed to the host placeshifting device from the digital camera, wherein the host placeshifting device receives the second digital media content signal at a channel hosting pathway of the host placeshifting device that differs from the first media receiving pathway;

at the host placeshifting device, encoding the demodulated first digital media content signal and encoding the second digital media content signal;

determining the presence of the first client device for receiving the encoded first digital media content signal and the encoded second digital media content signal at a first location that is remote from a location of the host placeshifting device;

determining the presence of the second client device for receiving the encoded second digital media content signal, but not the encoded first digital media content signal at a second location that is remote from the location of the host placeshifting device and that is remote from the first location, wherein the second location is different from the first location;

providing the first client device with electronic access to both the encoded first and second digital media content signals via the network and the backend media server;

receiving a usage request from the second client device, wherein the usage request comprises an electronic request to receive the encoded second digital media content signal, wherein the usage request is a request for access to the live streaming media content that is produced by the owner of the host placeshifting device, wherein the usage request originates from an electronic key accessed via a social networking website;

determining whether the usage request is within a pre-approved category or not within the pre-approved category;

if the usage request is within the pre-approved category, automatically granting permission, based on the usage request from the second client device, for the second client device to receive the encoded second digital media content signal, wherein if the usage request is not within the pre-approved category, the owner of the host placeshifting device receives a permission request to grant the second client device access to the encoded second digital media content signal and the second client device is not granted permission to receive the encoded second digital media content signal until such time as the owner of the placeshifting device grants permission, wherein the granting of permission grants permission to media content that is produced by the owner of the host placeshifting device;

once permission is granted, either automatically or by the owner, providing the second client device with electronic access to the encoded second digital media content signal, but not the first encoded digital media content signal, via the network and the backend media server;

distributing the first and second encoded digital media content signals from the host placeshifting device over the network and via the backend media server to the first client device; and distributing the second encoded digital media content signal, but not the first encoded digital media content signal, from the host placeshifting device over the network and via the backend media server to the second client device, wherein the encoded second digital media content signal is distributed in the form of a personalized television channel hosted by the owner of the host placeshifting device.

2. The method of claim 1, wherein receiving the first digital media content comprises receiving pay/subscription media content that is made available to a plurality of subscribers.

3. The method of claim 1, wherein receiving the second digital media content comprises transferring media content from a remote data storage device.

4. The method of claim 1, wherein providing the first and second clients with electronic access comprises establishing a plurality of rules using a rules engine.

5. The method of claim 4, wherein at least one of the plurality of rules comprises a type of content, or a particular content, allowed to be broadcast on the personalized television channel.

6. The method of claim 4, wherein at least one of the plurality of rules comprises a type of user, or a particular user, who is allowed to view the personalized television channel.

7. A system that communicates via a network with a first client device and a second client device and a backend media server, the system comprising:

a host placeshifting device that has performed thereon the following steps:

receiving a first digital media content signal at the host placeshifting device over a satellite, cable, or broadcast network, wherein the host placeshifting device is physically integrated with a digital media receiver that receives and demodulates the first digital media content signal and provides the demodulated first digital media content signal to the host placeshifting device, and wherein the host placeshifting device receives the demodulated first digital media content signal at a first media receiving pathway of the host placeshifting device;

while receiving the first digital media content signal, also receiving a second digital media content signal at the host placeshifting device, wherein receiving the second digital media content signal comprises receiving live streaming media content from a digital camera connected directly to the host placeshifting device via the internet and produced by an owner of the host placeshifting device, the second digital media content signal being pushed to the host placeshifting device from the digital camera, wherein the host placeshifting device receives the second digital media content signal at a channel hosting pathway of the host placeshifting device that differs from the first media receiving pathway;

at the host placeshifting device, encoding the demodulated first digital media content signal and encoding the second digital media content signal;

determining the presence of the first client device for receiving the encoded first digital media content signal and the encoded second digital media content signal at a first location that is remote from a location of the host placeshifting device;

determining the presence of the second client device for receiving the encoded second digital media content signal, but not the encoded first digital media content signal at a second location that is remote from the location of the host placeshifting device and that is remote from the first location, wherein the second location is different from the first location;

providing the first client device with electronic access to both the encoded first and second digital media content signals via the network and the backend media server;

receiving a usage request from the second client device, wherein the usage request comprises an electronic request to receive the encoded second digital media content signal, wherein the usage request is a request for access to the live streaming media content that is produced by the owner of the host placeshifting device, wherein the usage request originates from an electronic key accessed via a social networking website;

determining whether the usage request is within a pre-approved category or not within the pre-approved category;

if the usage request is within the pre-approved category, automatically granting permission, based on the usage request from the second client device, for the second client device to receive the encoded second digital media content signal, wherein if the usage request is not within the pre-approved category, the owner of the host placeshifting device receives a permission request to grant the second client device access to the encoded second digital media content signal and the second client device is not granted permission to receive the encoded second digital media content signal until such time as the owner of the placeshifting device grants permission, wherein the granting of permission grants permission to media content that is produced by the owner of the host placeshifting device;

once permission is granted, either automatically or by the owner, providing the second client device with electronic access to the encoded second digital media content signal, but not the first encoded digital media content signal, via the network and the backend media server;

distributing the first and second encoded digital media content signals from the host placeshifting device over the network and via the backend media server to the first client device; and distributing the second encoded digital media content signal, but not the first encoded digital media content signal, from the host placeshifting device over the network and via the backend media server to the second client device, wherein the encoded second digital media content signal is distributed in the form of a personalized television channel hosted by the owner of the host placeshifting device.

8. The system of claim 7, wherein receiving the first digital media content comprises receiving pay/subscription media content that is made available to a plurality of subscribers.

9. The system of claim 7, wherein receiving the second digital media content comprises receiving streaming media content from a digital recorder or a digital camera.

10. The system of claim 7, wherein receiving the second digital media content comprises transferring media content from a remote data storage device.

11. The system of claim 7, wherein providing the first and second clients with electronic access comprises establishing a plurality of rules using a rules engine.

12. The system of claim 11, wherein at least one of the plurality of rules comprises a type of content, or a particular content, allowed to be broadcast on the personalized television channel.

13. The system of claim 11, wherein at least one of the plurality of rules comprises a type of user, or a particular user, who is allowed to view the personalized television channel.

* * * * *